(12) United States Patent
Kojima et al.

(10) Patent No.: US 10,913,090 B2
(45) Date of Patent: Feb. 9, 2021

(54) APPLICATOR

(71) Applicant: GC Corporation, Shizuoka (JP)

(72) Inventors: Shinichi Kojima, Tokyo (JP); Kazuya Ishida, Nasukarasuyama (JP)

(73) Assignee: GC CORPORATION, Tokyo (JP)

( * ) Notice: Subject to any disclaimer, the term of this patent is extended or adjusted under 35 U.S.C. 154(b) by 0 days.

(21) Appl. No.: 16/636,433

(22) PCT Filed: Jun. 4, 2018

(86) PCT No.: PCT/JP2018/021372
§ 371 (c)(1),
(2) Date: Feb. 4, 2020

(87) PCT Pub. No.: WO2019/031040
PCT Pub. Date: Feb. 14, 2019

(65) Prior Publication Data
US 2020/0171530 A1     Jun. 4, 2020

(30) Foreign Application Priority Data

Aug. 7, 2017  (JP) ................................. 2017-152748

(51) Int. Cl.
*B05C 17/005* (2006.01)
*A61C 5/62* (2017.01)
*B05C 5/00* (2006.01)

(52) U.S. Cl.
CPC .............. *B05C 17/005* (2013.01); *A61C 5/62* (2017.02); *B05C 5/00* (2013.01)

(58) Field of Classification Search
CPC ............ B05C 17/005; B05C 5/00; A61C 5/62
See application file for complete search history.

(56) References Cited

U.S. PATENT DOCUMENTS 4,340,367 A * 7/1982 Vadas ...................... A61C 5/62
433/89
4,966,537 A   10/1990 Bowles et al.
(Continued)

FOREIGN PATENT DOCUMENTS

EP   0 326 551 A1   8/1989
GB   2 211 248 A    6/1989
(Continued)

OTHER PUBLICATIONS

International Search Report dated Aug. 28, 2018, issued in counterpart International Application No. PCT/JP2018/021372 (2 pages).

*Primary Examiner* — Frederick C Nicolas
(74) *Attorney, Agent, or Firm* — Westerman, Hattori, Daniels & Adrian, LLP

(57) ABSTRACT

An applicator (1) includes a main body (10), a parallel crank (40), and a lever (50). The parallel crank (40) includes a first crank bar (41) and a second crank bar (42). The first crank bar (41) and the second crank bar (42) each have one end portion swingably coupled to the main body (10). To the lever (50), another end portion of the first crank bar (41) and another end portion of the second crank bar (42) are each swingably coupled. The second crank bar (42) covers at least a part of side surfaces on both sides of the first crank bar (41) in an axial direction of a pin (43) as a rotation axis of the first crank bar (41) with respect to the main body (10) in a sandwiching manner.

5 Claims, 6 Drawing Sheets

(56) References Cited

U.S. PATENT DOCUMENTS

| | | | |
|---|---|---|---|
| 5,052,243 A * | 10/1991 | Tepic | B05C 17/0126 74/523 |
| 5,499,548 A * | 3/1996 | Keller | B05C 17/0126 222/391 |
| 5,960,996 A | 10/1999 | Hsu | |
| 6,296,484 B1 | 10/2001 | Nihei et al. | |
| 6,412,667 B1 * | 7/2002 | Huang | B05C 17/013 222/327 |
| 6,766,923 B1 | 7/2004 | Huang | |
| 8,783,526 B2 * | 7/2014 | Strobel-Schmidt | B05C 17/0126 222/391 |
| 10,595,963 B2 * | 3/2020 | Miyano | B05C 17/00553 |

FOREIGN PATENT DOCUMENTS

| | | | | |
|---|---|---|---|---|
| GB | 2343882 A * | 5/2000 | | B05C 17/00583 |
| JP | 48-33854 U | 4/1973 | | |
| JP | 10-85645 A | 4/1998 | | |
| JP | 2000-93865 A | 4/2000 | | |
| JP | 2000-308647 A | 11/2000 | | |
| JP | 2005-287764 A | 10/2005 | | |
| JP | 2013-47422 A | 3/2013 | | |
| JP | 2014-18094 A | 2/2014 | | |
| WO | 89/01322 A1 | 2/1989 | | |

* cited by examiner

APPLICATOR

TECHNICAL FIELD

The present invention relates to an applicator configured to extrude fluid material by human power.

BACKGROUND ART

Currently, in the field of dentistry and the like, there has been known an applicator configured to extrude fluid material such as cement by human power. The applicator is also referred to as a dispenser in some cases. For example, Patent Literature 1 discloses a dental viscous material dispenser that includes a lever whose one end portion is swingably coupled to a main body and an extrusion rod held onto the main body. For the applicator that includes the lever whose one end portion is swingably coupled to the main body as Patent Literature 1, a user grips the lever and a part of the main body with one hand and pulls the lever to the main body side. At this time, the extrusion rod moves in its axial direction corresponding to the movement of the lever, and fluid material is extruded by the extrusion rod.

[Patent Literature 1] JP2000-308647 A

SUMMARY OF INVENTION

Here, for the applicator that includes the lever whose one end portion is swingably coupled to the main body as Patent Literature 1, the lever is turned with respect to the main body to be pulled to the main body side. That is, an angle of the lever with respect to the main body changes while the fluid material is extruded. Therefore, the way of applying a force to the lever by the user tends to change. Accordingly, the user has difficulty in gripping the lever and the main body, and fails to properly extrude the fluid material in some cases.

In view of this, the lever and the main body are desired to be easily gripped. For this desire, it can be considered to make the angle of the lever with respect to the main body not change while the fluid material is extruded. The configuration in which the lever behaves in such a manner includes a configuration in which a lever is coupled to a main body via a parallel crank that includes a pair of crank bars. However, for the parallel crank, since a distance between the crank bars changes when the crank bars each swing, it is concerned that a hand of the user is sandwiched between the crank bars. Therefore, the user needs to be careful when operating the lever, and there is a room for improving an operability of the applicator.

In view of this, the present invention provides an applicator having an excellent operability.

To achieve the above-described object, an applicator of the present invention includes a main body, a parallel crank, and a lever. The parallel crank includes a first crank bar and a second crank bar. The first crank bar and the second crank bar each have one end portion swingably coupled to the main body. To the lever, another end portion of the first crank bar and another end portion of the second crank bar are each swingably coupled. The second crank bar covers at least a part of side surfaces on both sides of the first crank bar in a rotation axis direction of the first crank bar with respect to the main body in a sandwiching manner.

According to the applicator of the present invention, since the lever is coupled to the main body via the parallel crank, a change of an angle of the lever with respect to the main body is restrained when a user grips the lever and the main body to pull the lever to the main body side, and the user can properly transmit a force to the lever. Since the second crank bar covers at least a part of the side surfaces on both the sides of the first crank bar in the rotation axis direction of the first crank bar with respect to the main body in a sandwiching manner, a gap between the first crank bar and the second crank bar becomes less likely to be exposed. Therefore, sandwiching the user's hand between the first crank bar and the second crank bar is restrained. Accordingly, the user can reduce precautions against sandwiching the hand in the parallel crank, and the applicator having an excellent operability can be provided.

Furthermore, the second crank bar is preferred to cover the side surfaces on both the sides of the first crank bar at least from the main body to the lever.

This configuration causes the gap between the first crank bar and the second crank bar to be much less likely to be exposed, and sandwiching the user's hand between the first crank bar and the second crank bar is more restrained.

Furthermore, a shape on a cross section perpendicular to a longitudinal direction of the second crank bar is preferred to be an approximately U shape.

This configuration ensures the second crank bar formed of one member, and the number of components can be reduced. The second crank bar can cover the side surface positioned on the lever side or the side surface positioned on the opposite side of the lever of the first crank bar in addition to the side surfaces on both sides of the first crank bar. Therefore, sandwiching the user's hand between the first crank bar and the second crank bar is more restrained. Since a strength against twist of the second crank bar can be enhanced, dimensions of outer shapes on cross sections perpendicular to the longitudinal directions of the first crank bar and the second crank bar can be decreased, and the applicator can be downsized.

Furthermore, the main body is preferred to hold an extrusion rod coupled to the parallel crank, and the first crank bar is preferred to include a cantilever that transmits a force to the extrusion rod.

With this configuration, the first crank bar on which a large force acts can be protected by the second crank bar, and durability of the applicator is improved. Since the second crank bar does not need to have a high strength compared with the first crank bar, the dimension of the outer shape on the cross section perpendicular to the longitudinal direction of the second crank bar can be decreased, and the applicator can be downsized. A strength design of the parallel crank can be based on not the second crank bar that covers the first crank bar, but the first crank bar less likely to have a complicated shape on the cross section perpendicular to the longitudinal direction, and the design of the applicator can be facilitated.

Furthermore, the second crank bar is preferred to be formed of a resin.

This configuration can easily provide a soft texture to the parallel crank, and designability is easily improved. Manufacturing the parallel crank is facilitated to ensure excellent productivity of the applicator.

As described above, the present invention can provide the applicator having the excellent operability.

DESCRIPTION OF EMBODIMENTS

The following describes embodiments of an applicator according to the present invention with the attached drawings. The embodiments below are described for easy understanding of the present invention, and are not in any way to be construed as limiting the present invention. The present invention may be modified and improved from the following embodiments without departing from the scope of the invention.

First Embodiment

Figure 1:
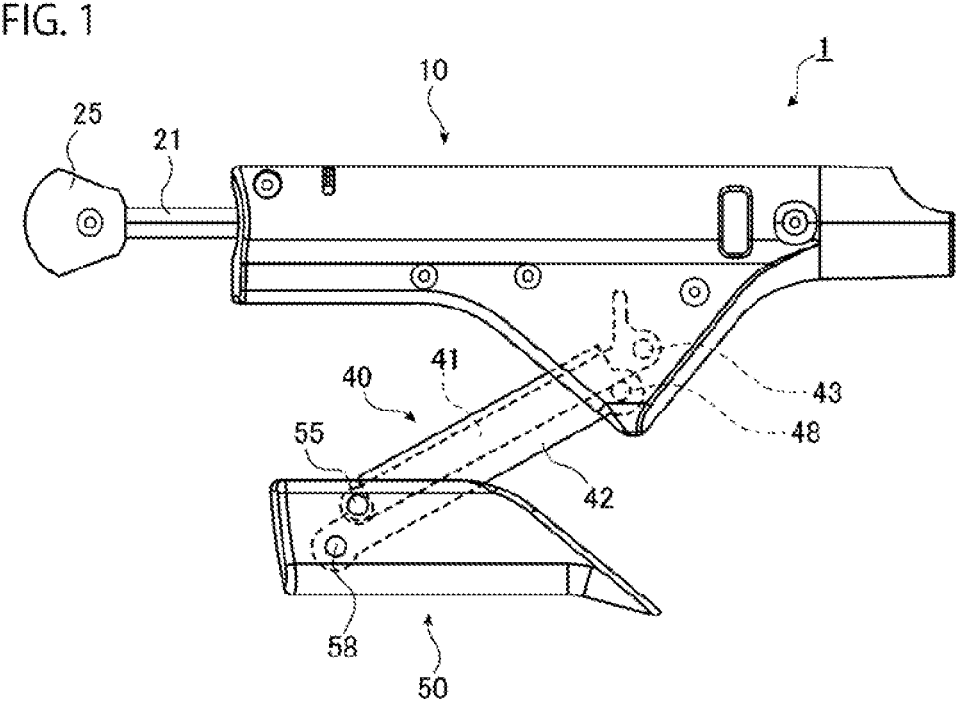
FIG. 1 is a side view illustrating an exemplary applicator in a first embodiment of the present invention.

FIG. 1 is a side view illustrating an exemplary applicator in the embodiment. As illustrated in FIG. 1, an applicator 1 of the embodiment includes a main body 10, an extrusion rod 21, a parallel crank 40, and a lever 50, as main components. The extrusion rod 21 is held onto the main body 10, and the lever 50 is coupled to the main body 10 via the parallel crank 40.

Figure 2:
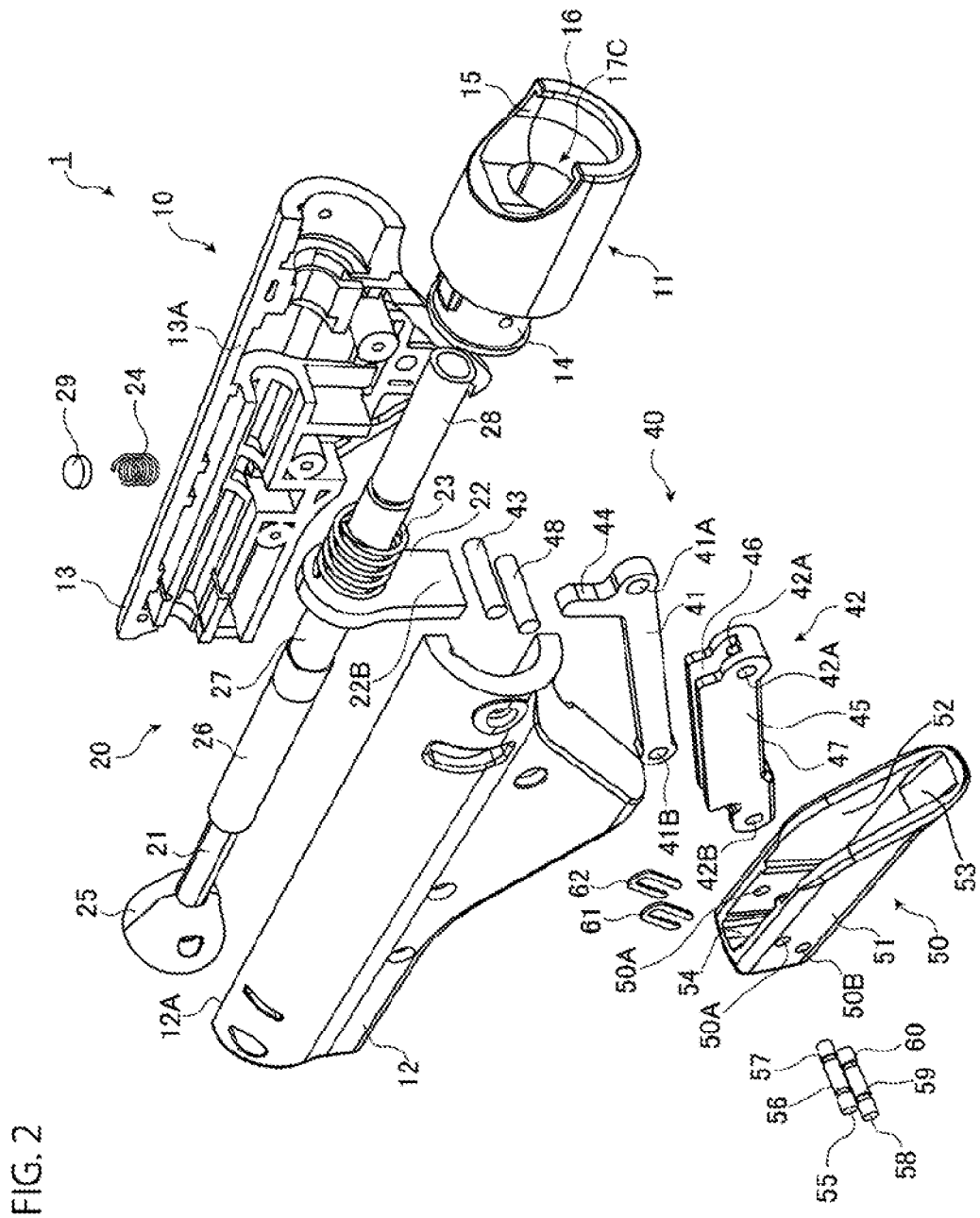
FIG. 2 is an exploded view illustrating a configuration of the applicator of FIG. 1.
Figure 3:
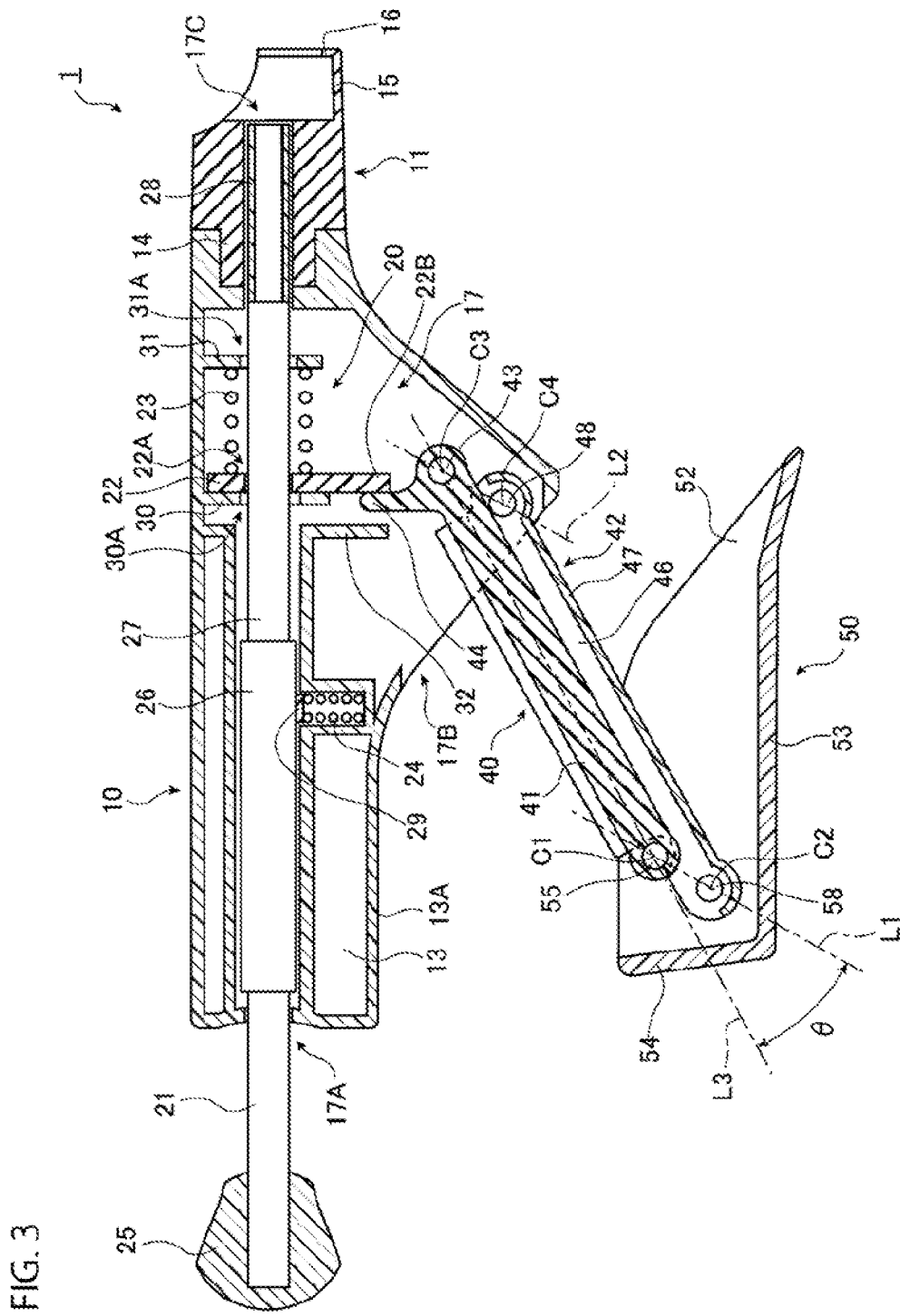
FIG. 3 is a cross-sectional view of the applicator passing through an axis of an extrusion rod of FIG. 1.

FIG. 2 is an exploded view illustrating a configuration of the applicator 1 of FIG. 1. FIG. 3 is a cross-sectional view of the applicator 1 passing through an axis of the extrusion rod 21. FIG. 3 illustrates a state where the lever 50 is separated from the main body 10. In FIG. 3, for easy understanding, the main configuration of the applicator 1 is illustrated, and a part of a plurality of ribs formed inside the main body 10 is omitted.

As illustrated in FIG. 2, in this embodiment, the main body 10 includes an end cover 11 and a pair of side covers 12 and 13. The end cover 11 is a cylindrically-shaped member, and includes a fitting portion 14 having a decreased outer diameter on one end. The end cover 11 includes a holder 15, a part of which in a radial direction of the end cover 11 is cut out, on the other end. The holder 15 has a thinned thickness by thinning its inner side, and includes a rib 16 on an end portion on the opposite side of the fitting portion 14. The holder 15 holds a capsule (not illustrated) in which fluid material such as cement is poured.

The pair of side covers 12 and 13 are disposed to be mutually opposed, and the side cover 12 includes a joint 12A projecting toward the side cover 13 side on its peripheral edge portion while the side cover 13 includes a joint 13A projecting toward the side cover 12 side on its peripheral edge portion. The pair of side covers 12 and 13 are put together to sandwich the fitting portion 14 of the end cover 11, and subsequently, joined such that their joints 12A and 13A are brought into close contact with one another. As illustrated in FIG. 3, the main body 10 internally includes a housing portion 17 as a space surrounded by the end cover 11 and the pair of side covers 12 and 13.

The main body 10 has three openings 17A, 17B, and 17C through which the housing portion 17 communicates with an external space. The openings 17A and 17B are formed on the joints 12A and 13A of the pair of side covers 12 and 13 of the main body 10. The opening 17C is formed on the end cover 11, and the opening 17C has an edge specified by an edge of an inner peripheral surface forming a through hole of the end cover 11 on the holder 15 side. The opening 17A and the opening 17C are formed on positions where a straight line passes through the opening 17A and the opening 17C.

The main body 10 includes three abutting walls 30, 31, and 32 projecting from an inner surface of the side cover 13 toward an inner surface of the side cover 12, and the three abutting walls 30, 31, and 32 are formed across the housing portion 17 in a direction approximately perpendicular to a cylindrical axis direction of the end cover 11. The abutting wall 30 has a circular through hole 30A passing through the abutting wall 30 in a thickness direction of the abutting wall 30, and a cylindrical axis of the end cover 11 passes through the through hole 30A. The abutting wall 31 has a circular through hole 31A passing through the abutting wall 31 in a thickness direction of the abutting wall 31, and a cylindrical axis of the end cover 11 passes through the through hole 31A. The abutting wall 31 is positioned on the end cover 11 side with respect to the abutting wall 30. The abutting walls 30, 31, and 32 may be configured to project from the inner surface of the side cover 12 toward the inner surface of the side cover 13, or may include a wall projecting from the inner surface of the side cover 12 toward the inner surface of the side cover 13 and a wall projecting from the inner surface of the side cover 13 toward the inner surface of the side cover 12.

The pair of side covers 12 and 13 are joined with screws (not illustrated). The pair of side covers 12 and 13 may be bonded with an adhesive, or may be joined using a lock structure where a protrusion and the like formed on one member is locked to a groove and the like formed on the other member. The end cover 11 is joined to the pair of side covers 12 and 13 with screws (not illustrated). The end cover 11 may be bonded to the pair of side covers 12 and 13 with an adhesive. The end cover 11 may be locked to the side covers 12 and 13 such that protrusions formed on an outer peripheral surface of the end cover 11 are fitted to grooves formed on the inner surfaces of the pair of side covers 12 and 13.

The end cover 11 may be divided into two parts by a surface passing through the cylindrical axis of the end cover 11, and one divided part may be integrated with the side cover 12 while the other divided part may be integrated with the side cover 13. Thus, with the one divided part of the end cover 11 integrated with the side cover 12 and the other part integrated with the side cover 13, the number of components can be reduced to ensure cost reduction of the applicator 1.

As illustrated in FIGS. 2 and 3, the housing portion 17 as the internal space of the main body 10 houses the main part of an extrusion mechanism 20 including the extrusion rod 21. In this embodiment, the extrusion mechanism 20 includes the extrusion rod 21, a push plate 22, a coiled spring 23, and a coiled spring 24, as the main configuration.

The extrusion rod 21 is an approximately column-shaped member, the extrusion rod 21 has an axis that approximately matches the cylindrical axis of the end cover 11, and the extrusion rod 21 is held onto the main body 10 movably in an axial direction of the extrusion rod 21. The extrusion rod 21 has one end projecting outside the main body 10 from the opening 17A. To the one end projecting outside the main body 10, a tab 25 is secured. The extrusion rod 21 includes a large-diameter portion 26 and a small-diameter portion 27 with a predetermined interval from the tab 25 in the axial direction. The diameter of the extrusion rod 21 is maximum at the large-diameter portion 26. The small-diameter portion 27 is coupled to the large-diameter portion 26, and has a diameter smaller than the diameter of the large-diameter portion 26.

The small-diameter portion 27 passes through the through hole 30A of the abutting wall 30 and the through hole 31A of the abutting wall 31 described above. An end portion of the small-diameter portion 27 on the opposite side of the large-diameter portion 26 has a further small diameter, and a collar 28 as a cylindrically-shaped member is installed to this portion having the small diameter. The collar 28 has an outer diameter approximately identical to the diameter of the small-diameter portion 27, and the collar 28 has an inner diameter larger than the diameter of the portion having the small diameter of the small-diameter portion 27. The portion having the small diameter of the small-diameter portion 27 is internally inserted through the collar 28, and the collar 28 is rotatably installed to the small-diameter portion 27. The collar 28 is positioned on the end cover 11 side with respect to the abutting wall 31.

The push plate 22 is a plate-shaped member. The push plate 22 is disposed between the abutting wall 30 and the abutting wall 31. The push plate 22 has a circular through hole 22A passing through the push plate 22 in a thickness direction of the push plate 22. The push plate 22 includes a pressure receiver 22B with a predetermined interval from the through hole 22A in a radial direction of the through hole 22A.

The through hole 22A has a diameter smaller than the diameter of the large-diameter portion 26 and larger than the diameter of the small-diameter portion 27. The small-diameter portion 27 of the extrusion rod 21 is inserted through the through hole 22A. Therefore, when the push plate 22 is approximately perpendicular to the axis of the extrusion rod 21, the push plate 22 is movable on the small-diameter portion 27 in the axial direction of the extrusion rod 21. Meanwhile, when the push plate 22 is inclined with respect to the axis of the extrusion rod 21, a large friction resistance is generated between the push plate 22 and the extrusion rod 21, and the movement of the push plate 22 on the small-diameter portion 27 in the axial direction of the extrusion rod 21 is restrained. The push plate 22 is housed in the housing portion 17 such that the turn with the extrusion rod 21 as the axis is restrained.

The coiled spring 23 is contractibly disposed between the push plate 22 and the abutting wall 31, and the coiled spring 23 has one end abutting on the push plate 22 and the other end abutting on the abutting wall 31. The small-diameter portion 27 of the extrusion rod 21 is inserted through the coiled spring 23.

On the push plate 22 thus housed in the housing portion 17, an elastic force of the coiled spring 23 acts so as to push back the push plate 22 when the push plate 22 moves to the coiled spring 23 side. Therefore, the inclination of the push plate 22 with respect to the axis of the extrusion rod 21 is restrained. A spring constant and a size of the coiled spring 23 may be appropriately set.

A friction plate 29 is a plate-shaped member, and abuts on an outer peripheral surface of the large-diameter portion 26. The friction plate 29 is pushed on the outer peripheral surface of the large-diameter portion 26 by an elastic force of the coiled spring 24 housed in the housing portion 17 in a contracted state. Therefore, a static friction force of the extrusion rod 21 when moving in the axial direction is increased, and rattling of the extrusion rod 21 is restrained. A spring constant and a size of the coiled spring 24 may be appropriately set.

As illustrated in FIGS. 1 to 3, an end portion of the parallel crank 40, which couples the lever 50 to the main body 10, on the main body 10 side is housed in the housing portion 17 of the main body 10 via the opening 17B. Meanwhile, an end portion of the parallel crank 40 on the lever 50 side is housed inside the lever 50.

The parallel crank 40 includes a first crank bar 41 and a second crank bar 42. In this embodiment, the first crank bar 41 is a quadrangular prism-shaped member. As illustrated in FIG. 2, on one end portion in a longitudinal direction of the first crank bar 41, a through hole 41A passing through the first crank bar 41 in a direction perpendicular to the longitudinal direction is formed. On the other end portion in the longitudinal direction of the first crank bar 41, a through hole 41B passing through the first crank bar 41 in a direction approximately identical to that of the through hole 41A is formed. A pin 43 is inserted through the through hole 41A. The pin 43 inserted through the through hole 41A has one end held onto the side cover 12 and the other end held onto the side cover 13, and thus the pin 43 is installed to the main body 10. The pin 43 is disposed so as to have its axial direction approximately perpendicular to the axial direction of the extrusion rod 21. Thus, the one end portion of the first crank bar 41 is swingably coupled to the main body 10 having the pin 43 as a rotation axis.

The first crank bar 41 includes a cantilever 44 extending in a direction approximately perpendicular to the pass-through direction of the through hole 41A at a proximity of the through hole 41A. The cantilever 44 is formed to abut on a surface of the pressure receiver 22B of the push plate 22 on a side where the abutting wall 30 is positioned when the first crank bar 41 turns to approach the main body 10. The above-described abutting wall 32 faces the push plate 22, and is disposed such that the cantilever 44 is sandwiched between the abutting wall 32 and the push plate 22. Then, the cantilever 44 abuts on the abutting wall 32 with a predetermined turn angle when the first crank bar 41 turns to move away from the main body 10. Accordingly, for the turn of the first crank bar 41 with respect to the main body 10, the turn of the first crank bar 41 in the direction moving away from the main body 10 is restricted to the predetermined turn angle. The first crank bar 41 may be a column-shaped member, or may be a hollow cylindrical member.

Figure 4:
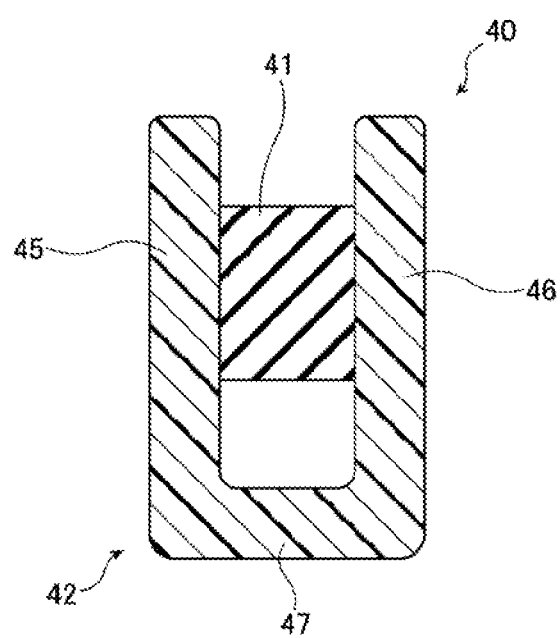
FIG. 4 is a cross-sectional view perpendicular to a longitudinal direction of a parallel crank of FIG. 1.

The second crank bar 42 extends approximately parallel to the first, crank bar 41. FIG. 4 is a cross-sectional view perpendicular to a longitudinal direction of the parallel crank 40 of FIG. 1. In this embodiment, as illustrated in FIGS. 2 and 4, the second crank bar 42 includes a pair of side plates 45 and 46, and a bottom plate 47. The pair of side plates 45 and 46 are disposed to be mutually opposed. The bottom plate 47 couples edge portions of the pair of side plates 45 and 46 on the opposite side of the main body 10 side, among the edge portions along the longitudinal direction. Therefore, a shape of the second crank bar on a cross section perpendicular to the longitudinal direction is an approximately U shape. The second crank bar 42 covers at least a part of side surfaces on both sides of the first crank bar 41 in a rotation axis direction of the first crank bar 41 with respect to the main body 10, that is, in the axial direction of the pin 43 with the pair of side plates 45 and 46 in a sandwiching manner. The second crank bar 42 covers at least a part of the side surfaces of the first crank bar 41 positioned on the opposite side of the main body 10 side with the bottom plate 47. Therefore, an exposure of the first crank bar 41 is restrained, and the first crank bar 41 is protected by the second crank bar 42. Furthermore, an exposure of a gap between the first crank bar 41 and the second crank bar 42 is restrained.

As illustrated in FIG. 2, on one end portion in the longitudinal direction of the second crank bar 42, a pair of through holes 42A continuously passing through the pair of side plates 45 and 46 of the second crank bar 42 in the thickness direction are formed. On the other end portion in the longitudinal direction of the second crank bar 42, a pair of through holes 42B continuously passing through the pair of side plates 45 and 46 in the thickness direction are formed similarly to the through holes 42A. A pin 48 is inserted through the pair of through holes 42A. The pin 48 inserted through the pair of through holes 42A has one end held onto the side cover 12 and the other end held onto the side cover 13, and thus the pin 48 is installed to the main body 10, similarly to the pin 43. The pin 48 is disposed so as to have its axial direction approximately parallel to the axial direction of the pin 43. Thus, the one end portion of the second crank bar 42 is swingably coupled to the main body 10 having the pin 48 as the rotation axis.

The second crank bar 42 may be configured of the pair of mutually opposed side plates 45 and 46 without the bottom plate 47. However, from the aspect of the protection of the first crank bar 41 and cost reduction, the second crank bar 42 is preferred to be formed to have the shape on the cross section perpendicular to the longitudinal direction in the approximately U shape as described above. With the second crank bar 42 formed to have the shape on the cross section perpendicular to the longitudinal direction in the approximately U shape, the number of components can be reduced to ensure cost reduction for assembling the applicator 1. Additionally, strength against twist of the second crank bar 42 can be enhanced. Accordingly, dimensions of outer shapes on cross sections perpendicular to the longitudinal directions of the first crank bar 41 and the second crank bar 42 can be decreased, and thus, the applicator 1 can be downsized. The bottom plate 47 may couple the edge portions of the pair of side plates 45 and 46 on the main body 10 side, among the edge portions in the direction perpendicular to the longitudinal direction. That is, the second crank bar 42 may be formed to cover at least a part of the side surfaces of the first crank bar 41 positioned on the main body 10 side with the bottom plate 47. The second crank bar 42 may be a cylindrical member through which the first crank bar 41 is internally inserted. The cantilever 44 included in the first crank bar 41 may be formed on the second crank bar 42.

In this embodiment, as illustrated in FIGS. 2 and 3, the lever 50 includes a pair of side plates 51 and 52, a bottom plate 53, and an end plate 54. The pair of side plates 51 and 52 are disposed to be mutually opposed. The bottom plate 53 couples edge portions of the pair of side plates 51 and 52 on the opposite side of the main body 10 side, among the edge portions along the longitudinal direction. The end plate 54 couples edge portions of one end in the longitudinal direction of the pair of side plates 51 and 52 and the bottom plate 53. Therefore, a shape of the lever 50 on a cross section perpendicular to the longitudinal direction is an approximately U shape, and a shape of the lever 50 on a cross section parallel to the longitudinal direction is also an approximately U shape. Since the lever 50 includes the end plate 54, falling down of the side plates 51 and 52 can be restrained, and thus, the strength of the lever 50 can be enhanced.

The pair of side plates 51 and 52 of the lever 50 are formed such that the end portions in the longitudinal direction of the lever 50 on the opposite side of the side where the end plate 54 is positioned are tapered off toward the ends and the bottom plate 53. The bottom plate 53 of the lever 50 is formed such that the end portion in the longitudinal direction of the lever 50 on the opposite side of the side where the end plate 54 is positioned is inclined outward.

As illustrated in FIG. 2, the lever 50 includes a pair of through holes 50A continuously passing through the pair of side plates 51 and 52 in a thickness direction on the end portion in the longitudinal direction of the lever 50 on the side where the end plate 54 is positioned. The lever 50 includes a pair of through holes SOB continuously passing through the pair of side plates 51 and 52 in the thickness direction similarly to the through holes 50A at proximities of the through holes 50A.

The other end portion of the first crank bar 41 is disposed between the pair of side plates 51 and 52 of the lever 50 such that the through hole 41B approximately matches the pair of through holes 50A. A pin 55 is inserted through the through hole 41B of the first, crank bar 41 and the pair of through holes 50A of the lever 50, and the other end portion of the first crank bar 41 is swingably coupled to the lever 50.

The pin 55 includes two grooves 56 and 57 where an outer peripheral surface of the pin 55 is depressed over the whole circumference by the approximately same depth. The groove 56 is formed to be positioned between the first crank bar 41 and the side plate 51 of the lever 50 when the pin 55 is inserted through the through hole 41B of the first crank bar 41 and the through holes 50A of the lever 50. Meanwhile, the groove 57 is formed to be positioned between the first crank bar 41 and the side plate 52 of the lever 50 when the pin 55 is inserted through the through hole 41B of the first crank bar 41 and the through holes 50A of the lever 50.

The other end portion of the second crank bar 42 is, similarly to the first crank bar 41, disposed between the pair of side plates 51 and 52 of the lever 50 such that the pair of through holes 42B of the second crank bar 42 approximately match the pair of through holes 50B of the lever 50. A pin 58 is inserted through the pair of through holes 42B of the second crank bar 42 and the pair of through holes 50B of the lever 50, and the other end portion of the second crank bar 42 is swingably coupled to the lever 50.

The pin 58 has a configuration similar to that of the pin 55, and the pin 58 includes two grooves 59 and 60 where an outer peripheral surface is depressed over the whole circumference by the approximately same depth. The groove 59 is formed to be positioned between the side plate 45 of the second crank bar 42 and the side plate 51 of the lever 50 when the pin 58 is inserted through the through hole 42B of the second crank bar 42 and the through holes 50B of the lever 50. Meanwhile, the groove 60 is formed to be positioned between the side plate 46 of the second crank bar 42 and the side plate 52 when the pin 58 is inserted through the through hole 42B and the through holes 50B. The groove 59 of the pin 58 is formed to be positioned on a plane approximately same as that of the groove 56 of the pin 55. Meanwhile, the groove 60 of the pin 58 is formed to be positioned on a plane approximately same as that of the groove 57 of the pin 55.

As illustrated in FIG. 3, a distance between a center C1 of the pin 55 and a center C2 of the pin 58 is approximately same as a distance between a center C3 of the pin 43 and a center C4 of the pin 48. A straight line L1 that passes through the center C1 of the pin 55 and the center C2 of the pin 58 and is perpendicular to the axial direction of the pin 55 is approximately parallel to a straight line L2 that passes through the center C3 of the pin 43 and the center C4 of the pin 48 and is perpendicular to the axial direction of the pin 43. Therefore, when the first crank bar 41 turns with the pin 43 as the rotation axis, while the distance between the first crank bar 41 and the second crank bar 42 changes, the second crank bar 42 turns with the pin 48 as the rotation axis while being kept to be approximately parallel to the first crank bar 41. Then, the lever 50 moves while the state where the straight line L1 is approximately parallel to the straight line L2 is kept. Accordingly, when the lever 50 moves, change of the angle of the lever 50 with respect to the main body 10 is restrained.

As illustrated in FIG. 2, the pin 55 and the pin 58 are installed to the lever 50 by two U-shaped retaining rings 61 and 62. The U-shaped retaining rings 61 and 62 are plate-shaped members with the same shape.

Figure 5:
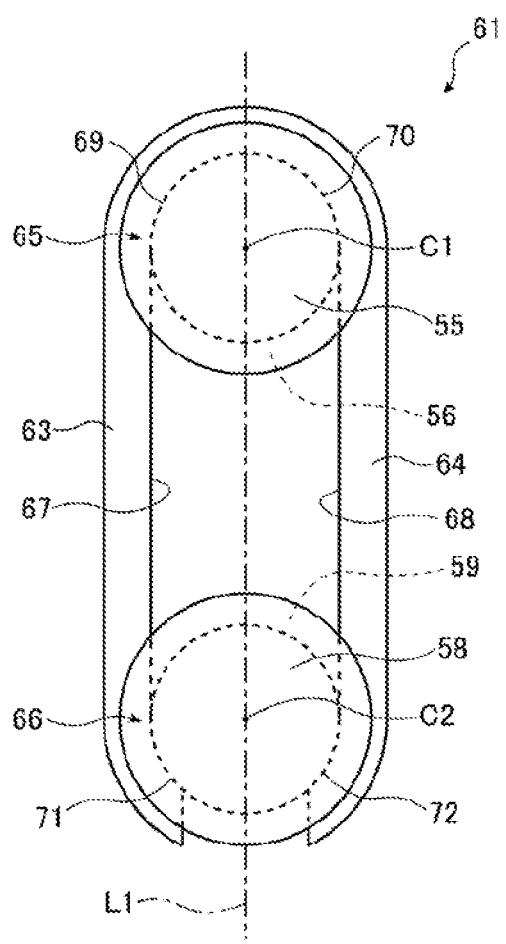
FIG. 5 is a drawing illustrating an exemplary U-shaped retaining ring.

The following describes a configuration of the U-shaped retaining ring 61, and the description of the configuration of the U-shaped retaining ring 62 will be omitted. FIG. 5 is a drawing illustrating an exemplary U-shaped retaining ring 61, and a drawing illustrating a state where the U-shaped retaining ring 61 is fitted to the pin 55 and the pin 58. The U-shaped retaining ring 61 includes a pair of arms 63 and 64 having joined one ends and separated other ends, and the shape of the U-shaped retaining ring 61 is an approximately U shape in plan view. The U-shaped retaining ring 61 sandwiches the pin 55 and the pin 58 between the pair of arms 63 and 64 in a radial direction. At this time, the pair of arms 63 and 64 partially fits to the groove 56 of the pin 55 and the groove 55 of the pin 58. Thus, the U-shaped retaining ring 61 is fitted to the pin 55 and the pin 58.

The U-shaped retaining ring 61 includes a first fitting portion 65 to which the pin 55 is fitted on the one end side where the arm 63 is joined to the arm 64, and a second fitting portion 66 to which the pin 58 is fitted on the other end side where the arm 63 is separated from the arm 64. The first fitting portion 65 includes abutting portions 65 and 70 on the one end side with respect to the center C1 of the pin 55, and inner edges 67 and 68 of the arms 63 and 64 at least partially abut on the bottom surface of the groove 56 of the pin 55 on the abutting portions 69 and 70. Meanwhile, the second fitting portion 66 includes abutting portions 71 and 72 on the other end side with respect to the center C2 of the pin 58, and the inner edges 67 and 68 of the arms 63 and 64 at least partially abut on the bottom surface of the groove 59 of the pin 58 on the abutting portions 71 and 72.

For the U-shaped retaining ring 61, the inner edges 67 and 68 abut on the bottom surface of the groove 56 of the pin 55 on the one end side with respect to the center C1 of the pin 55, and abut on the bottom surface of the groove 59 of the pin 58 on the other end side with respect to the center C2. Accordingly, rattling of the U-shaped retaining ring 61 in a direction perpendicular to a thickness direction of the U-shaped retaining ring 61 is restrained. For the U-shaped retaining ring 61, portions that do not overlap the pin 55 and the pin 58 in plan view are held between the side plate 51 of the lever 50 and the side plate 45 of the second crank bar 42. Accordingly, the movements of the pin 55 and the pin 58 in the respective axial directions are restrained. Thus, the pin 55 and the pin 58 are installed to the lever 50 by the U-shaped retaining ring 61.

The first fitting portion 65 may further include portions on the other end side with respect to the center C1 of the pin 55, and the inner edges 67 and 68 abut on the bottom surface of the groove 56 of the pin 55 on these portions. The second fitting portion 66 may further include portions on the one end side with respect to the center C2 of the pin 58, and the inner edges 67 and 68 abut on the bottom surface of the groove 59 of the pin 58 on these portions. This configuration can further restrain the rattling of the U-shaped retaining ring 61 in the direction perpendicular to the thickness direction of the U-shaped retaining ring 61.

The U-shaped retaining rings 61 and 62, as a single member, can install the pin 55 and the pin 58 to the lever 50. Accordingly, the number of components can be reduced to ensure cost reduction of the applicator 1.

Since the pin 55 and the pin 58 are installed to the lever 50 with the two U-shaped retaining rings 61 and 62, it is not necessary to divide the lever 50 into two parts in the axial direction of the pin 55, and the number of components can be reduced to ensure cost reduction of the applicator 1. The assembling process of the lever 50 can be reduced to ensure improved productivity of the applicator 1.

The materials constituting the respective members of the applicator 1 are not specifically limited. From the aspect of productivity and the like, the material constituting the pair of side covers 12 and 13, the tab 25, the collar 28, the second crank bar 42, the lever 50, and the like can include a resin, such as polypropylene, polyethylene, polycarbonate, polystyrene, ABS resin, acrylic, polyethylene terephthalate, polyacetal, polyamide, polysulfone, polyethersulfone, polyether ether ketone, and polyphthalamide. The pair of side covers 12 and 13, the second crank bar 42, and the lever 50, which are exposed outside, formed of resin ensure facilitating soft, textures, colors, or patterns. Accordingly, the designability of the applicator 1 can foe easily improved, and for example, the applicator 1 can foe easily made familiar to an infant. From the aspect of durability and the like, the material constituting the end cover 11, the extrusion rod 21, the push plate 22, the friction plate 29, the first crank bar 41, the pin 43, the pin 48, the pin 55, the pin 58, and the U-shaped retaining rings 61 and 62 can include a metal, such as aluminum, stainless steel, and carbon steel. When the extrusion rod 21 is formed of a metal and the fluid material possibly reacts with the metal, the collar 28 is preferred to be formed of the above-described resin. This configuration can restrain the fluid material from adhering to the extrusion rod 21 to react with the extrusion rod 21, thus protecting the extrusion rod 21 to ensure the improved durability of the applicator 1.

Next, a behavior of the applicator 1 will be described.

Figure 6:
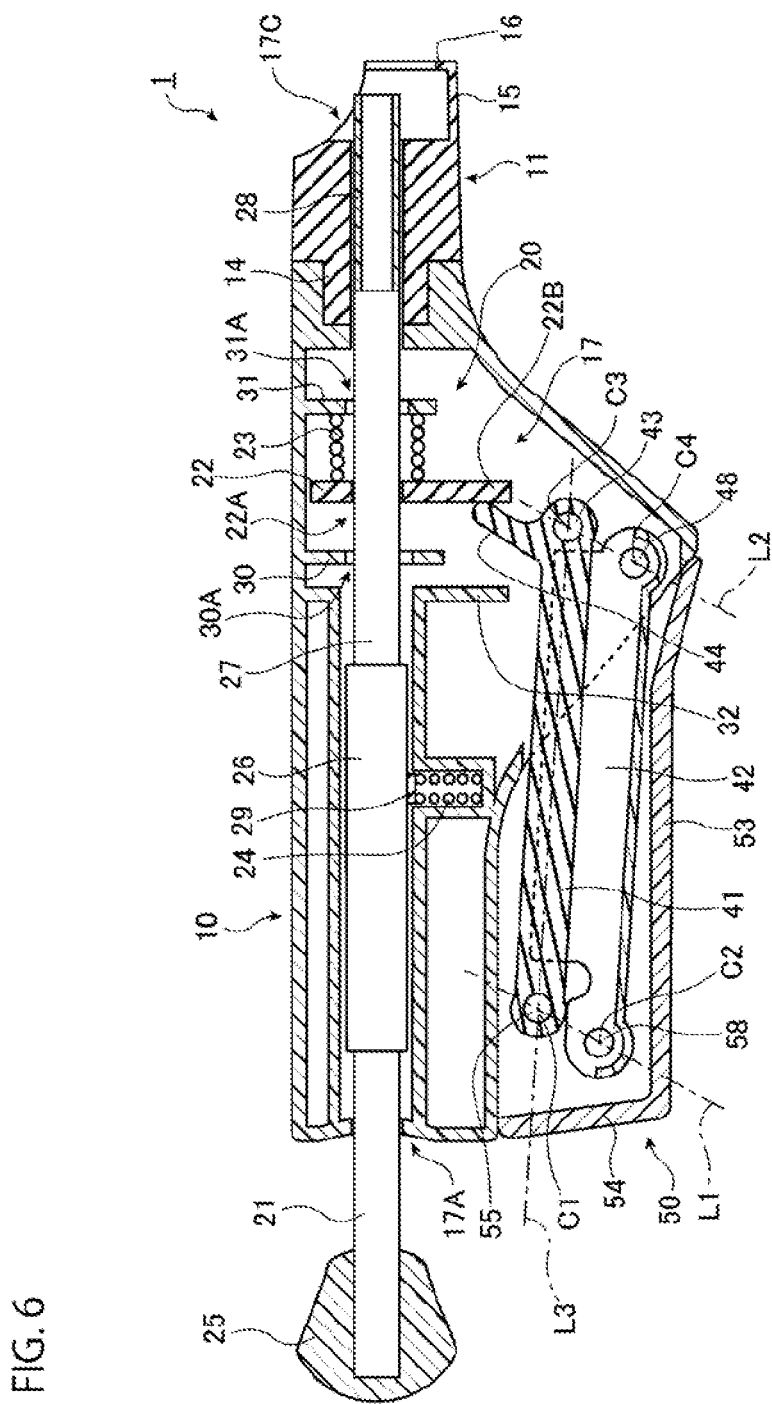
FIG. 6 is a drawing illustrating a state where a lever is pulled to a main body from the same view point as FIG. 3.

FIG. 6 is a drawing illustrating a state where the lever 50 is pulled to the main body 10 from the same view point as FIG. 3. When handling the applicator 1, the user grips the lever 50 and a part of the main body 10 with the whole palm of the hand such that, for example, a second finger to a fifth finger of one hand are hooked to the lever 50 in a state where the lever 50 is separated from the main body 10 as illustrated in FIGS. 1 and 3. Therefore, the user grips the lever 50 and the main body 10 in a state where a part of the palm of the hand of the user is positioned at the proximity of the parallel crank 40. With the lever 50 pulled to the main body 10 side, the applicator 1 changes the state from that of FIG. 3 to that of FIG. 6.

As the applicator 1 illustrated in FIG. 3 becomes the applicator 1 illustrated in FIG. 6, when the lever 50 is pulled to the main body 10 side, the first crank bar 41 turns with respect to the main body 10 with the pin 43 as the rotation axis such that the first crank bar 41 approaches the main body 10. The second crank bar 42 similarly turns with respect to the main body 10 with the pin 43 as the rotation axis such that the second crank bar 42 approaches the main body 10.

With the turn of the first crank bar 41, the push plate 22 is pushed to the end cover 11 side by the cantilever 44 of the first crank bar 41. Since the cantilever 44 abuts on the pressure receiver 22B having the predetermined interval from the through hole 22A, the push plate 22 is inclined with respect to the axis of the extrusion rod 21. Therefore, a large friction resistance is generated between the push plate 22 and the extrusion rod 21, thus restraining relative movements of the push plate 22 and the extrusion rod 21 in the axial direction. When the pressure receiver 22B of the push plate 22 is further pushed to the end cover 11 side by the cantilever 44 in this state, the push plate 22 and the extrusion rod 21 integrally move to the end cover 11 side. Thus, the force to grip the lever 50 and a part of the main body 10 is transmitted to the extrusion rod 21 via the cantilever 44 of the first crank bar 41, thus the extrusion rod 21 is moved. Since the elastic force of the coiled spring 23 acts on the push plate 22, when a force overcoming this elastic force, a static friction force acting on the extrusion rod 21, or the like acts on the push plate 22, the push plate 22 and the extrusion rod 21 integrally move to the end cover 11 side.

With the movement of the extrusion rod 21 to the end cover 11 side, the end portion of the extrusion rod 21 to which the collar 28 is installed is projected to the holder 15 through the opening 17C, and the fluid material such as cement in the capsule (not illustrated) held onto the holder 15 is extruded from the capsule.

When the force to grip the lever 50 and a part of the main body 10 is released from the lever 50, the push plate 22 is pushed back to the abutting wall 30 side by the elastic force of the coiled spring 23. The coiled spring 23 has one end abutting on a portion surrounding a peripheral edge of the through hole 22A of the push plate 22 at a proximity of the peripheral edge. Therefore, as described above, the push plate 22 is less likely to be inclined with respect to the axis of the extrusion rod 21, and the large friction resistance is less likely to be generated between the push plate 22 and the extrusion rod 21. Accordingly, the push plate 22 is pushed back to the abutting wall 30 side by the elastic force of the coiled spring 23 without the movement of the extrusion rod 21.

At this time, the cantilever 44 is pushed by the push plate 22, and the first crank bar 41 turns with respect to the main body 10 in a direction where the first crank bar 41 moves away from the main body 10, thus the applicator 1 becomes in the state illustrated in FIG. 3. Since the turn of the first crank bar 41 in the direction moving away from the main body 10 stops when the cantilever 44 abuts on the abutting wall 32 as described above, the lever 50 is restrained from moving away from the main body 10 by a predetermined distance or more. Therefore, the lever 50 is avoided significantly moving away from the main body 10, thus a difficulty in gripping the lever 50 and a part of the main body 10 is restrained.

The extrusion rod 21 moves to the end cover 11 side by a predetermined distance every time when the lever 50 and a part of the main body 10 are gripped. With the movement of the extrusion rod 21, the push plate 22 moves to the large-diameter portion 26 side. Since the through hole 22A of the push plate 22 has a diameter smaller than the diameter of the large-diameter portion 26, the push plate 22 can move only to the end portion of the small-diameter portion 27 on the large-diameter portion 26 side. Therefore, when the push plate 22 moves to the end of the small-diameter portion 27 on the large-diameter portion 26 side, the movement of the extrusion rod 21 to the end cover 11 side is restrained. Accordingly, an upper limit of the amount of projection of the extrusion rod 21 to the holder 15 can be set, and thus a damage of the applicator 1 can be restrained.

Since the extrusion rod 21 has a portion, to which the tab 25 is secured, positioned outside the main body 10, the user can easily pull back the extrusion rod 21 that has moved to the end cover 11 side.

The lever 50 is coupled to the main body 10 by the parallel crank 40 that includes the first crank bar 41 and the second crank bar 42, and as described above, the change of the angle of the lever 50 with respect to the main body 10 while the lever 50 is pulled to the main body 10 side is restrained. Accordingly, the user easily grips the lever 50 and a part of the main body 10, and the force can be properly transmitted to the lever 50.

As described above, the applicator 1 of this embodiment includes the main body 10, the parallel crank 40, and the lever 50. The parallel crank 40 includes the first crank bar 41 and the second crank bar 42 that each have one end portion swingably coupled to the main body 10. To the lever 50, the other end portion of the first crank bar 41 and the other end portion of the second crank bar are each swingably coupled. The second crank bar 42 covers at least a part of the side surfaces on both sides of the first crank bar 41 in the axial direction of the pin 43 as the rotation axis of the first crank bar with respect to the main body 10 in a sandwiching manner.

According to the applicator 1 of this embodiment, since the lever 50 is coupled to the main body 10 via the parallel crank 40, the change of the angle of the lever 50 with respect to the main body 10 is restrained when the user grips the lever 50 and the main body 10 and pulls the lever 50 to the main body side. Accordingly, the user can properly transmit the force to the lever. Since the second crank bar 42 covers at least a part of the side surfaces on both sides of the first crank bar 41 in the axial direction of the pin 43 as the rotation axis of the first crank bar 41 with respect to the main body 10 in a sandwiching manner, the gap between the first crank bar 41 and the second crank bar 42 becomes less likely to be exposed. Here, when gripping the lever 50 and the main body 10, a part of the palm of the hand of the user is positioned at the proximity of the parallel crank 40. However, since the second crank bar 42 causes the gap between the first crank bar 41 and the second crank bar 42 to be less likely to be exposed, sandwiching the user's hand between the first crank bar 41 and the second crank bar 42 is restrained. Accordingly, the user can reduce precautions against sandwiching of the hand in the parallel crank 40, thus ensuring the applicator 1 having the excellent operability.

In this embodiment, the second crank bar 42 covers the side surfaces on both sides of the first crank bar 41 in the axial direction of the pin 43 at least from the main body 10 to the lever 50. This configuration causes the gap between the first crank bar 41 and the second crank bar 42 to be much less likely to be exposed, thus sandwiching the user's hand between the first crank bar 41 and the second crank bar 42 is more restrained.

In this embodiment, the second crank bar 42 is formed to have the approximately U shape on the cross section perpendicular to the longitudinal direction. This configuration allows the second crank bar 42 to cover the side surface positioned on the lever 50 side or the side surface positioned on the opposite side of the lever 50 of the first crank bar 41, thus sandwiching the user's hand between the first crank bar 41 and the second crank bar 42 is more restrained. Since the user hooks the finger to the lever 50 to grip the lever 50 and a part of the main body 10, the user possibly causes the finger to abut on the side surface of the first crank bar 41 positioned on the lever 50 side by mistake. Therefore, the shape of the cross section of the second crank bar 42 is more preferred to be the approximately U shape so as to cover the side surface of the first crank bar 41 positioned on the lever 50 side, thus sandwiching the user's hand between the first crank bar 41 and the second crank bar 42 is more restrained.

In this embodiment, as illustrated in FIG. 3, in the state before the lever 50 is pulled to the main body 10 side, the angle between the straight line L1, which passes through the center C1 of the pin 55 and the center C2 of the pin 58 and is perpendicular to the axial direction of the pin 55, and a straight line L3, which passes through the center C1 of the pin 55 and the center C3 of the pin 43 and is perpendicular to the axial direction of the pin 55, is configured to be an acute angle. In the parallel crank 40 of this configuration, when the user grips the lever 50 and a part of the main body 10, the distance between the first crank bar 41 and the second crank bar 42 changes to be increased. Here, when gripping the lever 50 and a part of the main body 10, since the user applies the force to push the fluid material from the capsule, a part of the palm of the hand is pushed on the parallel crank 40, and thus the user's hand is easily sandwiched between the first crank bar 41 and the second crank bar 42. Meanwhile, when the lever 50 is separated from the main body 10, since the user releases the force to grip the lever 50 and a part of the main body 10, a part of the palm of the hand moves away from the parallel crank 40, thus the user's hand is less likely to be sandwiched between the first crank bar 41 and the second crank bar 42. Therefore, with the angle between the straight line L1 and the straight line L3 configured to be the acute angle as described above, the distance between the first crank bar 41 and the second crank bar 42 changes to be increased when the user grips the lever 50 and a part of the main body 10, thus sandwiching the user's hand between the first crank bar 41 and the second crank bar 42 is more restrained.

In this embodiment, the first crank bar 41 covered with the second crank bar 42 includes the cantilever 44. Since the force to grip the lever 50 and a part of the main body 10 is transmitted to the extrusion rod via the cantilever 44, a large force acts on the first crank bar 41 compared with the second crank bar 42. The first crank bar 41 having this power transmission function can be protected by the second crank bar 42, thus ensuring the improved durability of the applicator 1. Since the second crank bar 42 does not need to have the high strength compared with the first crank bar 41, the dimension of the outer shape on the cross section perpendicular to the longitudinal direction of the second crank bar 42 can be decreased, thus ensuring the downsized applicator 1. The strength design of the parallel crank 40 can be based on not the second crank bar 42 that covers the first crank bar 41, but the first crank bar 41 less likely to have a complicated shape on the cross section perpendicular to the longitudinal direction, thus ensuring the facilitated design of the applicator 1.

While the present invention has been described above with the embodiment as an example, the present invention is not limited to them.

For example, while the above-described embodiment described the applicator 1 that includes the extrusion mechanism 20 to push the fluid material such as cement in the capsule from the capsule as an example, the fluid material is not limited to the fluid material housed in the capsule. The applicator may be configured to extrude fluid material filled in a tank formed on the main body 10 by the extrusion rod 21.

While in the above-described embodiment the extrusion mechanism 20 in which the force to pull the lever 50 is transmitted to the extrusion rod 21 via the push plate 22 as an exemplary extrusion mechanism is described, the extrusion mechanism is not limited to this configuration. The extrusion mechanism may have a configuration that includes a plurality of gears including rack and pinion and transmits the force to pull the lever 50 to the extrusion rod 21 via the plurality of gears.

While in the above-described embodiment the second crank bar 42 covers the side surfaces on both sides of the first crank bar 41 in the axial direction of the pin 43 at least from the main body 10 to the lever 50, the second crank bar may cover at least a part of the side surfaces on both sides of the first crank bar 41 in the axial direction of the pin 43 in a sandwiching manner.

While in the above-described embodiment the second crank bar 42 includes the bottom plate 47 and has the approximately U shape on the cross section perpendicular to the longitudinal direction of the second crank bar, the second crank bar 42 may include the pair of mutually opposed side plates 45 and 46 without the bottom plate 47.

While in the above-described embodiment the first crank bar 41 includes the cantilever 44, the second crank bar 42 may include the cantilever 44 instead of the first crank bar 41.

The present invention can provide the applicator having the excellent operability applicable to a field of dentistry and the like.

REFERENCE SIGNS LIST

1 . . . applicator
10 . . . main body
20 . . . extrusion mechanism
21 . . . extrusion rod
22 . . . push plate
23 . . . coiled spring
40 . . . parallel crank
41 . . . first crank bar
42 . . . second crank bar
44 . . . cantilever
43, 48, 55, 58 . . . pin (rotation axis)
50 . . . lever

The invention claimed is:

1. An applicator comprising:
a main body;
a parallel crank that includes a first crank bar and a second crank bar, the first crank bar and the second crank bar each having one end portion swingably coupled to the main body; and
a lever to which another end portion of the first crank bar and another end portion of the second crank bar are each swingably coupled, wherein
the second crank bar covers at least a part of side surfaces on both sides of the first crank bar in a rotation axis direction of the first crank bar with respect to the main body in a sandwiching manner.

2. The applicator according to claim 1, wherein
the second crank bar covers the side surfaces on both the sides of the first crank bar at least from the main body to the lever.

3. The applicator according to claim 1, wherein
a shape on a cross section perpendicular to a longitudinal direction of the second crank bar is an approximately U shape.

4. The applicator according to claim 1, wherein
the main body holds an extrusion rod coupled to the parallel crank, and the first crank bar includes a cantilever that transmits a force to the extrusion rod.

5. The applicator according to claim 1, wherein the second crank bar is formed of a resin.

* * * * *